United States Patent [19]

Graf

[11] Patent Number: 4,638,912
[45] Date of Patent: Jan. 27, 1987

[54] PACKAGE WITH TRANSFERABLE REUSABLE CLOSURE ELEMENT

[75] Inventor: Heinrich Graf, Beringen, Switzerland

[73] Assignee: SIG Schweizerische Industrie-Gesellschaft, Neuhausen am Rheinfall, Switzerland

[21] Appl. No.: 721,802

[22] Filed: Apr. 10, 1985

[30] Foreign Application Priority Data

Apr. 30, 1984 [CH] Switzerland ............. 2111/84

[51] Int. Cl.⁴ ............................................. B65D 33/16
[52] U.S. Cl. .................................... 206/621; 229/77; 383/62; 383/86; 383/89; 383/99
[58] Field of Search ................... 206/621, 632; 383/88, 383/89, 98, 99, 62, 95, 86; 229/73, 76, 80, 77, 78 R, 78 A, 78 B

[56] References Cited

U.S. PATENT DOCUMENTS

| | | | |
|---|---|---|---|
| 3,212,698 | 10/1965 | Balcolm | 383/88 X |
| 3,439,866 | 4/1969 | Kühnle | 229/74 |
| 3,439,868 | 4/1969 | Kühnle | 206/632 |
| 3,557,853 | 1/1971 | Jones | 383/86 |
| 4,084,689 | 4/1978 | Yamagata | 383/27 X |
| 4,428,485 | 1/1984 | Egli | 383/88 X |

FOREIGN PATENT DOCUMENTS

| | | | |
|---|---|---|---|
| 89519 | 11/1957 | Denmark | 229/79 |
| 595258 | 2/1978 | Switzerland . | |

*Primary Examiner*—William Price
*Assistant Examiner*—Bryon Gehman
*Attorney, Agent, or Firm*—Spencer & Frank

[57] ABSTRACT

A reclosable package has a generally rectangular outer wrapper including a top closure formed of panels folded to one another and against a top face of the package; a flap constituting a continuation of one of the panels; and a hook-and-eye fastener having hook and eye components attachable to and separable from one another. One of the components is permanently affixed to a face of the flap and the other component is readily removably carried on the one component. After an initial opening of the package, one fastener component is transferable from the other for permanent attachment to the wrapper, and the flap may be positioned over the wrapper such that the fastener components are in alignment for engagement with one another.

7 Claims, 12 Drawing Figures

4,638,912

PACKAGE WITH TRANSFERABLE REUSABLE CLOSURE ELEMENT

BACKGROUND OF THE INVENTION

This invention relates to a package which has a rigid and essentially rectangular wrapper provided with a folded top closure including a projecting flap. The top closure, after breaking the seal of the package, may be repeatedly opened and closed airtight to prevent dampness and flavor from entering or escaping from, the package.

A package of the above type is disclosed in Swiss Pat. No. 595,258. It is a disadvantage of the package disclosed therein that after breaking the seal, it is complicated and time-consuming to reclose the closure flaps since the inner bag has to be partially rolled-in and the closure flaps have to be fully inserted. The latter may easily unfold by virtue of their inherent resiliency so that the closure loses its sealing properties whereupon delicate contents such as ground coffee may absorb external humidity and may lose its flavor.

Other packages are known where the closure portions are provided with pressure responsive adhesives by means of which the closure parts may be immobilized. Adhesives, however, age rapidly and may be rendered ineffective by dust and other soiling. Further, the adhesive locations make a machine processing of such packages more difficult. It is a further disadvantage of these constructions that the adhesive locations may adversely affect the appearance of the packages.

SUMMARY OF THE INVENTION

It is an object of the invention to provide an improved package of the above-outlined type from which the discussed disadvantages are eliminated and which preserves its aesthetic appearance even after repeated opening and closing.

This object and others to become apparent as the specification progresses, are accomplished by the invention, according to which, briefly stated, on the projecting flap a first part of a hook-and-eye fastener (such as a Velcro fastener) is secured on which the other part of the hook-and-eye fastener is removably attached (for example, stapled) in such a manner that after breaking the seal of the package, the second part of the hook-and-eye fastener may be transferred to an external face of the wrapper for permanent attachment.

BRIEF DESCRIPTION OF THE DRAWINGS

FIG. 2b is a schematic sectional elevational view of the construction depicted in FIG. 2a.

FIG. 3b is a schematic sectional elevational view of the construction depicted in FIG. 3a.

FIG. 4b is a schematic sectional elevational view of the structure depicted in FIG. 4a.

FIG. 5b is a schematic sectional side elevational view of the construction illustrated in FIG. 5a.

FIG. 6b is a schematic sectional elevational view of the construction depicted in FIG. 6a.

DESCRIPTION OF THE PREFERRED EMBODIMENT

Figure 1A:
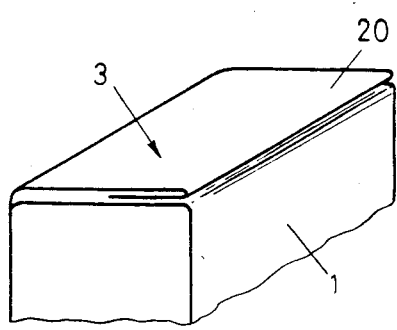
FIG. 1a is a schematic perspective view of the top part of a package illustrated in a sealed state and incorporating the invention.
Figure 1B:
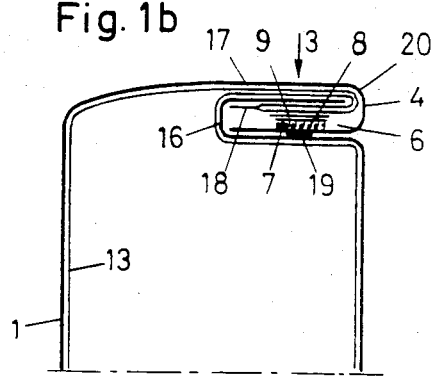
FIG. 1b is a schematic sectional side elevational view of the preferred embodiment in the sealed state.

Turning now to FIGS. 1a and 1b, there is shown the sealed package according to the invention, in a state as purchased by the customer. The non-illustrated contents are under vacuum in a sealed inner bag 13 which is received in a rectangular wrapper 1 made of relatively rigid material such as cardboard. The wrapper 1 has a recloseable top closure 3 which includes two lateral closing panels 14 and 15 (FIG. 2a) as well as a frontal and a rear closing panel 16 and 17, respectively. The rear closing panel 17 has a flap 4 which, in the sealed state of the package, is folded over by 180°; the doubling 20 formed of the flap 4 and the closing panels 16 and 17 is folded by 90° into a plane which is parallel to the oppositely lying bottom surface of the package. On the inner face 5 of the flap 4 there is glued a hook-and-eye fastener 6 formed of a first part 7 (for example, the hook component) and a second part 8 (for example, the eye component).

Figure 4A:
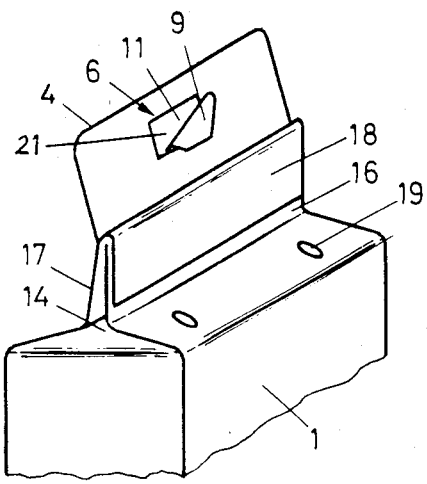
FIG. 4a is a schematic perspective view of the top part of the preferred embodiment illustrated in a partially reclosed position.

In the sealed state of the package, the hook-and-eye fastener 6 is not visible from the outside; it is situated between the flap 4 and an end flap 18 of the inner bag 13. The fastener part 7 is attached on the flap 4 by means of an adhesive whereas the fastener part 8 is removably connected to the first part, for example, by means of the hook-and-eye attachment. As shown in FIG. 4a, on the reverse side 11 of the fastener part 8 there is provided a self-adhesive coating 21 which is covered by a protective peel-off film 9. The flap 4 may carry several fastener parts 7 and associated fastener parts 8.

In the sealed state the flap 4 is glued to the frontal closure panel 16 at two locations 19.

Figure 2A:
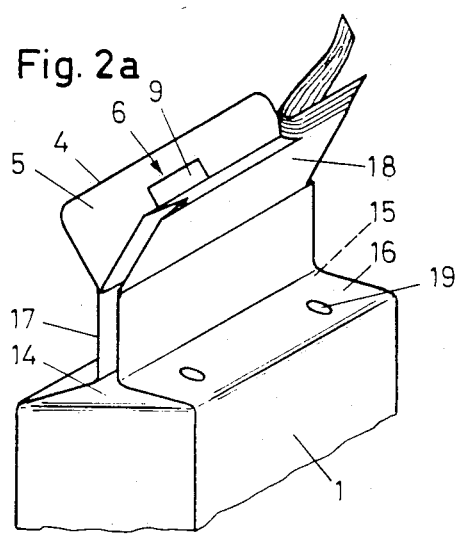
FIG. 2a is a schematic perspective view of the top part of the preferred embodiment after breaking the seal.
Figure 2B:
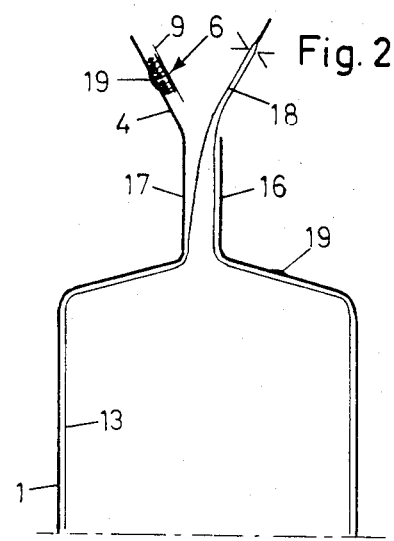
Figure 3A:
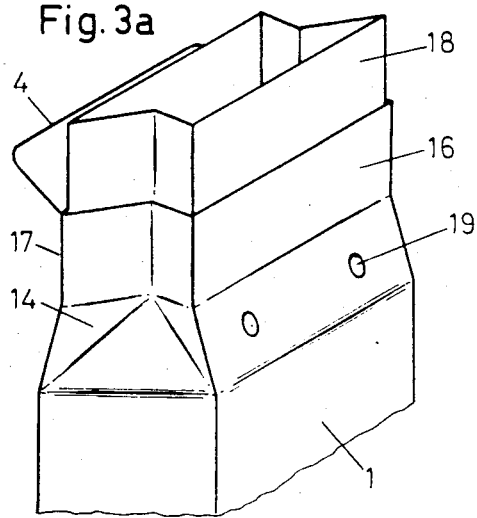
FIG. 3a is a schematic perspective view of the top part of the preferred embodiment, illustrated in the fully open position of the top closure.
Figure 3B:
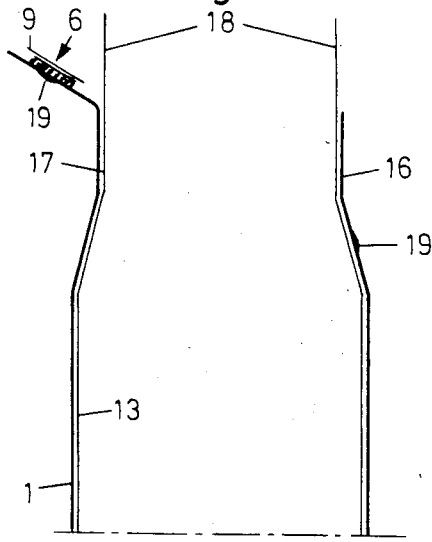

The seal of the unopened package is broken by grasping the doubled part 20 and pivoting it upwardly approximately 90° which will result in the breakage of the glued locations 19. The flap 4 is positioned upright and the bag 13 is cut open at the end flap 18 as illustrated in FIGS. 2a and 2b. Thereafter, the package is fully opened as shown in FIGS. 3a, 3b and the contents may be removed therefrom.

Figure 4B:
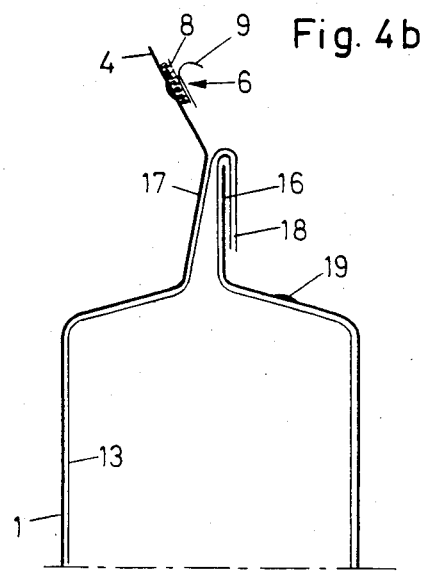
Figure 5A:
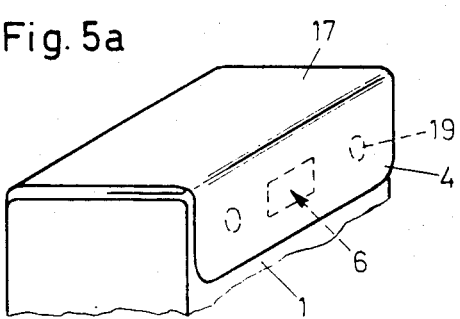
FIG. 5a is a schematic perspective view of the top part of the preferred embodiment illustrated in a fully reclosed position.
Figure 5B:
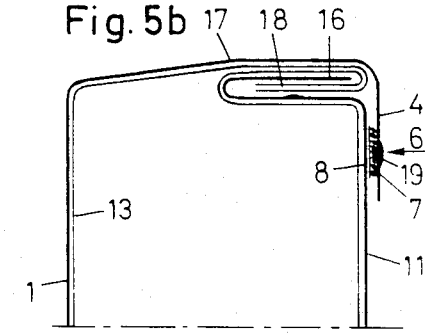
Figure 6A:
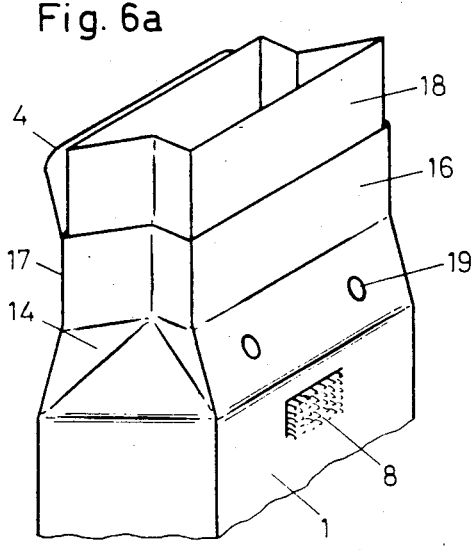
FIG. 6a is a schematic perspective view of the top part of the preferred embodiment, illustrated in a fully reopened position.
Figure 6B:
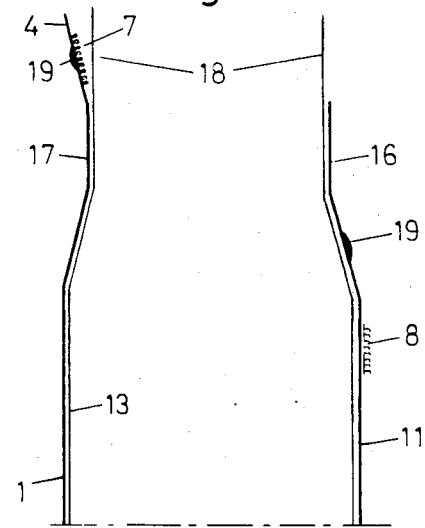

For reclosing the package, the protective film 9 is removed (FIGS. 4a and 4b) and the flap 4 is brought into its position illustrated in FIGS. 5a and 5b. The fastener part 8 is secured to the wrapper 1 by lightly pressing the flap 4 against the wrapper 1, whereupon the fastener part 8, by virtue of the adhesive 21 on the reverse side 11, will stick to the wrapper 1 and, as a result, the flap 4 is immobilized in that position.

The package arranged in such a manner may be reopened simply by grasping the flap 4 and pulling the closure part 7 from the fastener part 8 (bonded to the wrapper 1) and then the top closure 3 is unfolded. The package can be again closed by folding the top closure 3 and placing the flap 4 on the wrapper 1 whereby engagement between the two fastener parts 7 and 8 will occur. Because hook-and-eye fasteners are not sensitive to soiling and are highly wear-resistant, the package may be, for all practical purposes, reopened and reclosed for an unlimited number of times. On the package a label may be provided serving as a warranty seal.

It will be understood that the above description of the present invention is susceptible to various modifications, changes and adaptations, and the same are intended to be comprehended within the meaning and range of equivalents of the appended claims.

What is claimed is:

1. In a reclosable package having a generally rectangular outer wrapper including a top closure formed of panels folded to one another and against a top face of the package; a flap constituting a continuation of one of the panels; the improvement comprising a hook-and-eye fastener having hook and eye components attachable to and separable from one another; one of said components being permanently affixed to a face of said flap and the other component being readily removably carried on said one component and having a reverse side; and means for permanently attaching said other component by said reverse side to an external location of said wrapper, whereby for reclosing said package after an initial opening thereof, said other component being transferable from said one component for permanent attachment to said wrapper, and said flap being positionable over said wrapper such that said components are in alignment for engagement with one another.

2. A reclosable package as defined in claim 1, wherein said means for permanently attaching said other component comprises a self-adhesive layer provided on said reverse side; further comprising a protective peel-off film covering said self-adhesive layer.

3. A reclosable package as defined in claim 1, wherein said panels include two panels folded towards one another and against said top face, and a front panel and a rear panel folded together against said top face.

4. A reclosable package as defined in claim 3, wherein said flap is a continuation of said rear panel and said front panel is folded onto itself; further wherein said flap, together with said hook-and-eye fastener, is located between two layers of said front panel.

5. A reclosable package as defined in claim 1, further comprising a sealed inner bag received in said wrapper.

6. A reclosable package as defined in claim 5, wherein said inner bag has a terminal flap folded over an outer edge of one of said panels.

7. A reclosable package as defined in claim 1, wherein said top closure is glued to the wrapper.

* * * * *